US012598031B2

(12) United States Patent
Handte et al.

(10) Patent No.: US 12,598,031 B2
(45) Date of Patent: Apr. 7, 2026

(54) COMMUNICATION DEVICES AND METHODS

(71) Applicant: Sony Group Corporation, Tokyo (JP)

(72) Inventors: Thomas Handte, Stuttgart (DE); Dana Ciochina, Stuttgart (DE); Rajarishi Devarajan, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 575 days.

(21) Appl. No.: 18/000,688

(22) PCT Filed: May 31, 2021

(86) PCT No.: PCT/EP2021/064512
§ 371 (c)(1),
(2) Date: Dec. 5, 2022

(87) PCT Pub. No.: WO2021/249804
PCT Pub. Date: Dec. 16, 2021

(65) Prior Publication Data
US 2023/0231664 A1      Jul. 20, 2023

(30) Foreign Application Priority Data

Jun. 12, 2020 (EP) .................................... 20179630
Oct. 2, 2020 (EP) .................................... 20199873

(51) Int. Cl.
*H04L 1/1867* (2023.01)
*H04W 74/0816* (2024.01)
(52) U.S. Cl.
CPC ....... *H04L 1/1887* (2013.01); *H04W 74/0816* (2013.01)

(58) Field of Classification Search
None
See application file for complete search history.

(56) References Cited

U.S. PATENT DOCUMENTS

2003/0202501 A1    10/2003  Jang
2005/0204250 A1     9/2005  Hong et al.
2013/0100952 A1     4/2013  Hart
(Continued)

FOREIGN PATENT DOCUMENTS

CN          1454017 A     11/2003
CN          1910862 A      2/2007
(Continued)

OTHER PUBLICATIONS

English Translation of WO-2017031645 (Year: 2017).*
(Continued)

*Primary Examiner* — Saumit Shah
(74) *Attorney, Agent, or Firm* — XSENSUS LLP

(57) ABSTRACT

A communication device is configured to communicate with a second communication device, the communication device comprising circuitry configured to transmit one or more data frames to the second communication device that require a response by the second communication device, listen to a first response acknowledging receipt of at least one of the one or more data frames from the second communication device, and, if a first response is not received, change transmit opportunity configuration and/or channel access for non-data frames and/or data frames.

6 Claims, 11 Drawing Sheets

(56) References Cited

U.S. PATENT DOCUMENTS

| | | | | |
|---|---|---|---|---|
| 2015/0236822 | A1 | 8/2015 | Pirskanen | |
| 2015/0373587 | A1* | 12/2015 | Josiam | H04W 28/20 |
| | | | | 370/338 |
| 2016/0142192 | A1* | 5/2016 | Damnjanovic | H04L 5/0053 |
| | | | | 370/329 |
| 2019/0222364 | A1* | 7/2019 | Shimoda | H04W 28/06 |
| 2019/0349986 | A1* | 11/2019 | Aijaz | H04L 5/0035 |
| 2019/0394811 | A1* | 12/2019 | Yang | H04W 74/0816 |
| 2021/0368439 | A1* | 11/2021 | Karimaruthumkal | |
| | | | | H04L 5/0055 |
| 2022/0256596 | A1* | 8/2022 | Max | H04W 28/06 |
| 2022/0376833 | A1* | 11/2022 | Huang | H04L 1/1812 |

FOREIGN PATENT DOCUMENTS

| | | | |
|---|---|---|---|
| CN | 105612806 A | 5/2016 | |
| EP | 3220707 A1 | 9/2017 | |
| JP | 2005033399 A | 2/2005 | |
| JP | 2010093694 A | 4/2010 | |
| JP | 2015062307 A | 4/2015 | |
| JP | 2019213195 A | 12/2019 | |
| WO | WO-2011001469 A1 | 1/2011 | |
| WO | 2011/097758 A1 | 8/2011 | |
| WO | WO-2017031645 A1 * | 3/2017 | H04W 76/10 |
| WO | WO-2017157656 A1 | 9/2017 | |

OTHER PUBLICATIONS

International Search Report and Written Opinion mailed on Oct. 5, 2021, received for PCT Application PCT/EP2021/064512, filed on May 31, 2021, 13 pages.

IEEE, "Part 11: Wireless LAN Medium Access Control (MAC) and Physical Layer (PHY) Specifications", IEEE Computer Society, IEEE Std 802.11™-2020, Dec. 3, 2020, pp. 1-4377.

* cited by examiner

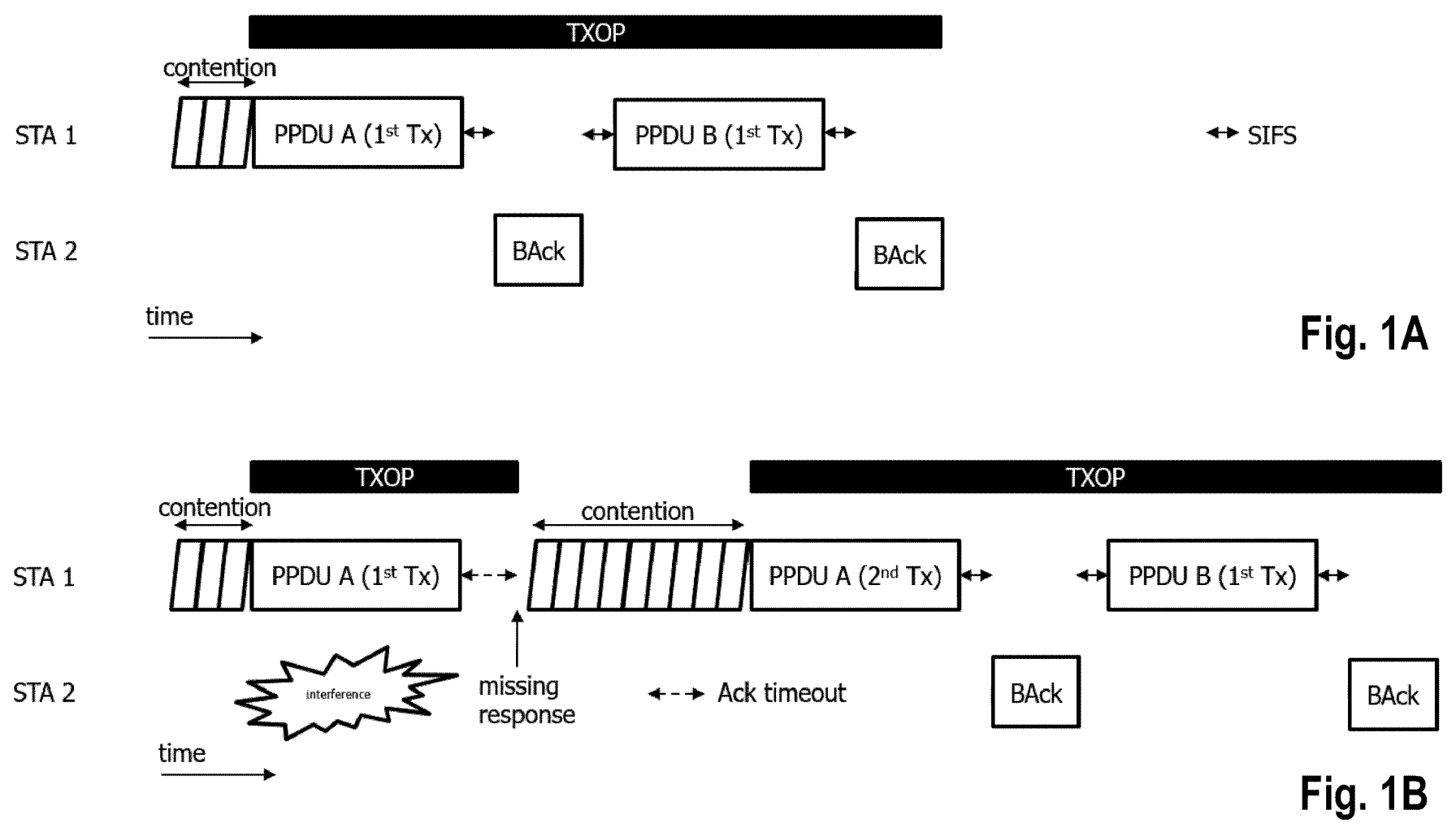

↔ SIFS

Fig. 1A

STA 1 contention

TXOP

PPDU A (1st Tx)

PPDU B (1st Tx)

STA 2

BAck

BAck time

Fig. 1B

STA 1 contention

TXOP

PPDU A (1st Tx)

contention

TXOP

PPDU A (2nd Tx)

PPDU B (1st Tx)

STA 2 interference missing response

←→ Ack timeout

BAck

BAck time

COMMUNICATION DEVICE

10

12 WIRELESS COMMUNICATION UNIT

11 DATA PROCESSING UNIT

13 CONTROL UNIT

14 STORAGE UNIT

COMMUNICATION DEVICES AND METHODS

CROSS-REFERENCE TO RELATED APPLICATIONS

The present application is based on PCT filing PCT/EP2021/064512, filed May 31, 2021, which claims priorities to EP 20179630.7, filed on Jun. 12, 2020, and EP 20199873.9, filed on Oct. 2, 2020, the entire contents of each are incorporated herein by reference.

BACKGROUND

Field of the Disclosure

The present disclosure relates to communication devices and methods, in particular for low-latency communications in Wireless LAN (VVLAN).

Description of Related Art

Since WLAN operates in unlicensed spectrum which is shared by communication devices, it may happen that transmitted data units, e.g. physical layer conformance procedure (PLCP) protocol data units (PPDUs), are not decodable or missed, e.g. due to another communication device sending at the same time or interference from another network or another wireless device.

When an entire PPDU is not decodable, i.e., there is a failed PPDU, this has a severe impact on latency as according to the current channel access rules of WLAN, a communication device, in particular a station (STA), extends (often doubles) its contention window in this case. In a busy network, this causes a communication device to wait for a long time before it may access the channel again and deliver the data that was supposed to be delivered within the failed PPDU.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admit-ted as prior art against the present disclosure.

SUMMARY

It is an object to provide enhanced channel access principles for WLAN that improve latency. It is a further object to provide corresponding communication devices and methods as well as a corresponding computer program and a non-transitory computer-readable recording medium for implementing said methods.

According to an aspect there is provided a communication device configured to communicate with a second communication device, the communication device comprising circuitry configured to transmit one or more data frames to the second communication device that require a response by the second communication device, listen to a first response acknowledging receipt of at least one of the one or more data frames from the second communication device, if a first response is not received, change transmit opportunity configuration and/or channel access for non-data frames and/or data frames.

According to a further aspect there is provided a communication method of a communication device for communicating with a second communication device, the communication method comprising transmitting one or more data frames to the second communication device that require a response by the second communication device, listening to a first response acknowledging receipt of at least one of the one or more data frames from the second communication device, and, if a first response is not received, changing transmit opportunity configuration and/or channel access for non-data frames and/or data frames.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication devices and as defined in the dependent claims and/or disclosed herein.

One of the aspects of the disclosure is to limit the increase in latency due to failed PPDU by use of one or more rules added to existing channel access mechanisms. Each rule may be applied alone or in conjunction with others.

This disclosure proposes enhanced channel access principles for Wireless LAN that improve latency. In more detail, several independent rules are defined that yield timely and fast retransmission after an initial transmission of a physical protocol data unit (PPDU; also referred to as data PPDU herein) failed. Failed PPDUs may occur because of interference or because two or more stations (STAs) collide, i.e. transmit at the same time. Thus, the proposed rules are suitable for distributed channel access, where collisions may appear frequently. It is further proposed that the AP STA may enable and require these rules for its associated STAs to be considered in order to achieve a basic service set (BSS) with low latency service.

Thus, according to embodiments of the present the disclosure, if a first acknowledgement is not received, a measure is taken to shorten the time the communication device has to wait before successfully retransmitting the data unit and/or the time a second communication device or another communication device has to wait before transmitting a data unit.

Throughout this disclosure, it is referred to an access point as AP STA, to a station as non-AP STA. The term STA is used interchangeably for non-AP STA or AP STA, i.e., it is applicable for both types of STAs.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 1A shows a schematic diagram that illustrates a conventional successful frame exchange between two STAs.

FIG. 1B shows a schematic diagram that illustrates the conventional behavior when the peer STA is unable to receive a first transmitted data unit.

FIG. 7A shows a schematic diagram illustrating conventional operation for retransmission with unchanged TXOP duration.

FIG. 7B shows a schematic diagram illustrating TXOP duration shortening according to an embodiment of the present disclosure.

FIG. 8 shows a schematic diagram of the configuration of a communication device 30 according to an embodiment of the present disclosure.

DETAILED DESCRIPTION OF THE EMBODIMENTS

Figures 2A, 2B:
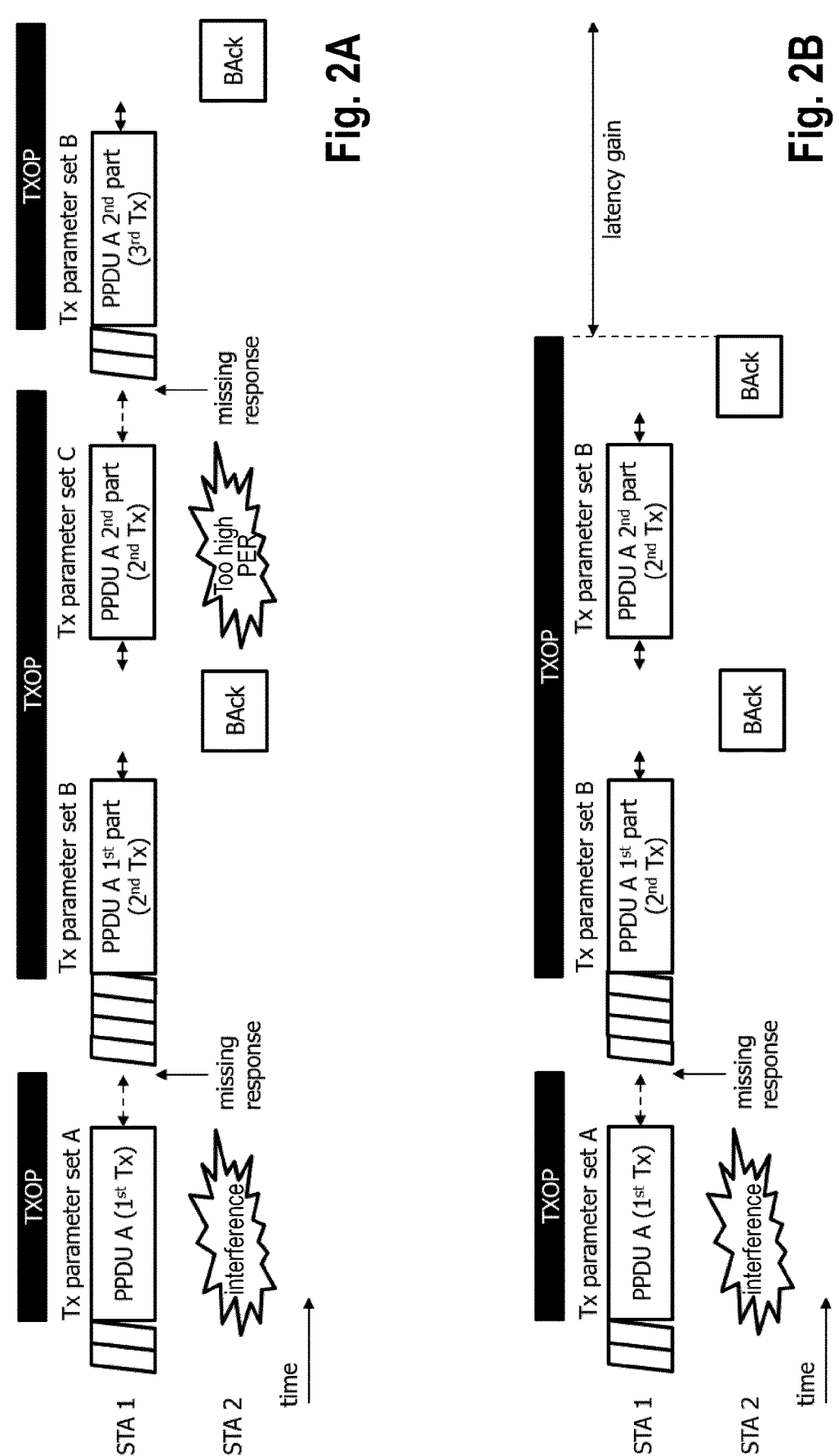
FIG. 2A shows a schematic diagram illustrating conventional retransmissions without exclusion of rate sounding.
FIG. 2B shows a schematic diagram illustrating retransmissions with exclusion of rate sounding according to an embodiment of the present disclosure.

In general, the present disclosure considers the case in which a STA transmitted one or more data units (in the following referred but not limited to PPDUs) within a transmit opportunity (TXOP). One or more of these PPDUs have not been decodable, i.e., there are one or more failed PPDUs, which is detected because a response (e.g. Ack, BAck) from the peer STA is missing. In this context, the missing response may be the only necessary condition for the detection of a failed data PPDU, because a missing response may also occur in case the response PPDU failed.

In case the missing response occurs within a TXOP, i.e. not at the beginning, it is additionally assumed that the channel is detected as busy at the transmitter or TXOP initiator location. In these two cases, i.e. missing response at the beginning of a TXOP or missing response and busy channel within a TXOP, the transmitting STA is supposed to stop transmission and to backoff. In this context, the beginning of a TXOP is understood to be the first response to one or more PPDUs within that TXOP, whereas within a TXOP is understood by the non-first response to one or more PPDUs within that TXOP.

Referring now to the drawings, wherein like reference numerals designate identical or corresponding parts throughout the several views, FIG. 1A shows a schematic diagram that illustrates a conventional successful frame exchange between two STAs. STA 1 performs contention by listening to the channel for a certain timespan given by an offset (AIFS) and a multiple of a predefined slot time. The multiple of the slot time is determined by the contention window (CW) value, which is initially drawn from a random uniform distribution, ranging from [0 . . . CWmin−1], once a STA has data available to transmit.

Generally, the CW value is decreased by one every time the interval of slot time has passed, and channel is idle. Once the CW value reaches zero and the channel is idle, STA 1 obtains a TXOP and transmits one or more PPDUs including any potential responses (Block Acknowledgement (BAck) in FIG. 1A) of the peer STA. A TXOP ends when STA1 has no more data to transmit or if the maximum time of a TXOP expired. Once a TXOP ended, a STA performs the contention process again as described above in order to obtain channel access.

FIG. 1B shows a schematic diagram that illustrates the conventional behavior when the peer STA, STA 2, is unable to receive the first transmitted PPDU due to interference for example. In this case, STA 2 does not transmit the response frame (i.e. any acknowledgement, also called "first acknowledgement" or "first response" herein) after PPDU A transmitted by STA 1 ended. STA 1 detects a missing response after a certain timeout, stops transmission and the related TXOP ends. In order to gain access to the channel again, STA 1 draws a new CW value from a uniform distribution with an increased range from [0 . . . 2 CWmin−1], i.e. a long contention time is likely.

Every time a specific PPDU is detected to be non-decodable or lost, the range of the uniform distribution of CW is generally further doubled. Transmissions by other STAs are the more likely to interrupt the CW countdown, the higher CW is. This may lead to severe latency not only due to longer contention time but also due to duration of other transmissions that are happening before STA 1 may be able to transmit again.

A PPDU may carry a MAC protocol data unit (MPDU) or an aggregated MPDU (A-MPDU) that contains one or more MPDUs in an aggregation. Each MPDU holds MAC header information, user data that is to be transmitted, and a check sequence that detects the integrity of that MPDU. A PPDU is non-decodable or failed, if the transmitter of the PPDU observes the following: every MPDU, which is contained in that PPDU, is non-intact, i.e. check sequence is wrong (this includes the case of a BAck response for example, which indicates that all MPDUs were erroneous); or the expected response frame from the peer STA is not received.

It shall be noted that three different types of frames are generally distinguished: data frames (frames that hold data, such as content, user data, communication data), control frames (e.g. Ack, BAck, Ack request, BAck request), and management frames (e.g. beacon frames).

The ideas presented in the following target the STA behavior after a non-decodable or failed PPDU occurred, i.e. for the retransmission of the data, i.e. MPDU or A-MPDU, residing in the failed PPDU. The following embodiments describe rules or add-ons augmenting existing rules and their application, which may be subject to AP STA decision for all non-AP STAs or a certain non-AP STA set. Each rule or add-on can be applied alone or in conjunction with others. The more STAs implement the rules, the more useful the rules will be. This may be important in context of legacy STAs, because they are not aware of these rules. Thus, two options may be envisioned for mitigation purposes.

According to a first option, the AP STA may restrict admission to its BSS (basic service set) subject to non-AP STA application of one or more of these rules or add-ons. Thus, the AP STA may create a BSS which is optimized for latency-sensitive data traffic. According to a second option, an advantage is provided to non-AP STAs that implement one or more procedure below in terms of enhanced distributed channel access (EDCA) parameters. This is because STAs that do not implement one or more procedures below may have a throughput advantage, but latency disadvantage. This advantage may be leveled out by slightly changing the access parameters.

A first embodiment of a device and method according to the present disclosure is illustrated in FIG. 2, wherein FIG. 2A shows a schematic diagram illustrating conventional retransmissions without exclusion of rate sounding and FIG. 2B shows a schematic diagram illustrating retransmissions with exclusion of rate sounding according to an embodiment of the present disclosure.

According to this embodiment, after a PPDU transmission failed, the STA changes the transmission operation for the next PPDU by altering one or more of the following transmission parameters in comparison to the failed PPDU:

modulation and coding scheme (MCS)
transmission bandwidth
number of spatial streams
transmit method (STBC or DCM)
PPDU type (SU-PPDU or MU-PPDU).

These transmission parameters have an impact on the length of the PPDU and the number of MPDUs that can be contained in a PPDU. Thus, retransmission of failed MPDUs may need several PPDUs. It is up to the STA which transmission parameters to apply. However, if a STA decides to change transmission parameters, it shall apply the same parameters for all PPDUs that contain retransmitted MPDUs until either the first PPDU that contains retransmitted MPDUs fails, or
all PPDUs that contain retransmitted data units succeed, or
after the first PPDU succeeds other transmission parameters knowingly exist that achieve higher ratio of succeeded to failed MPDUs.

Knowingly means that a STA examined these transmission parameters recently.

The rule applied according to this embodiment seeks to avoid examination of transmission parameters with PPDUs that contain retransmitted MPDUs. Such an examination is done by trial and error, i.e. a PPDU is transmitted using the transmission parameters to be examined. The response of the peer STA allows a conclusion on the quality of these transmission parameters. If the quality is unknown beforehand, a STA tolerates the loss of a PPDU, which is not desirable for a PPDU containing retransmitted MPDUs as it causes further retransmissions and latency.

In FIG. 2 the difference in operation without (FIG. 2A) or with (FIG. 2B) this rule is visible. Since this rule disallows transmitting the second part of PPDU A with an unknown transmission parameter set C, another retransmission is avoided, which causes the latency to lower.

As shown in FIG. 2B, after STA 1 transmitted a data unit (PPDU A) to STA 2, it listens to a first acknowledgement (e.g. Ack or BAck) of receipt of the data unit from STA 2. If a first acknowledgement is not received, a measure is taken to shorten the time the communication device has to wait before successfully retransmitting the data unit. In this embodiment, the data unit is retransmitted in parts, wherein one or more transmission parameters (Tx parameter set B) used for retransmitting the data are different from the transmission parameters (Tx parameter set A) used for initially transmitting the data unit.

In a variation, the transmission parameters for retransmitting all the parts of the data unit are identical. In another variation, after the first part of the data unit is retransmitted, STA 1 again listens for a second acknowledgement (also called "second response" herein) from STA 2. If a second acknowledgement is received by STA 1, one or more subsequent parts (e.g. the second part) of the data unit are retransmitted using one or more transmission parameters that are different from the transmission parameters used for initially transmitting the data unit. If a second acknowledgement is not received by STA 1, the next part of the data unit is transmitted with new transmission parameters (e.g. Tx parameter set C). The one or more different transmission parameters include one or more transmission parameters of the group of transmission parameters including modulation and coding scheme, transmission bandwidth, number of spatial streams, transmit method and type of data unit.

Hence, according to the embodiment illustrated with reference to FIG. 2, if a first response is not received, transmission parameters for transmission of data frames are changed. In particular, the one or more data frames are retransmitted in parts. One or more transmission parameters for retransmitting the one or more data frames are used that are different from the transmission parameters used for initially transmitting the one or more data frames, wherein the transmission parameters for retransmitting the parts of the one or more data frames are identical.

Figures 3A, 3B:
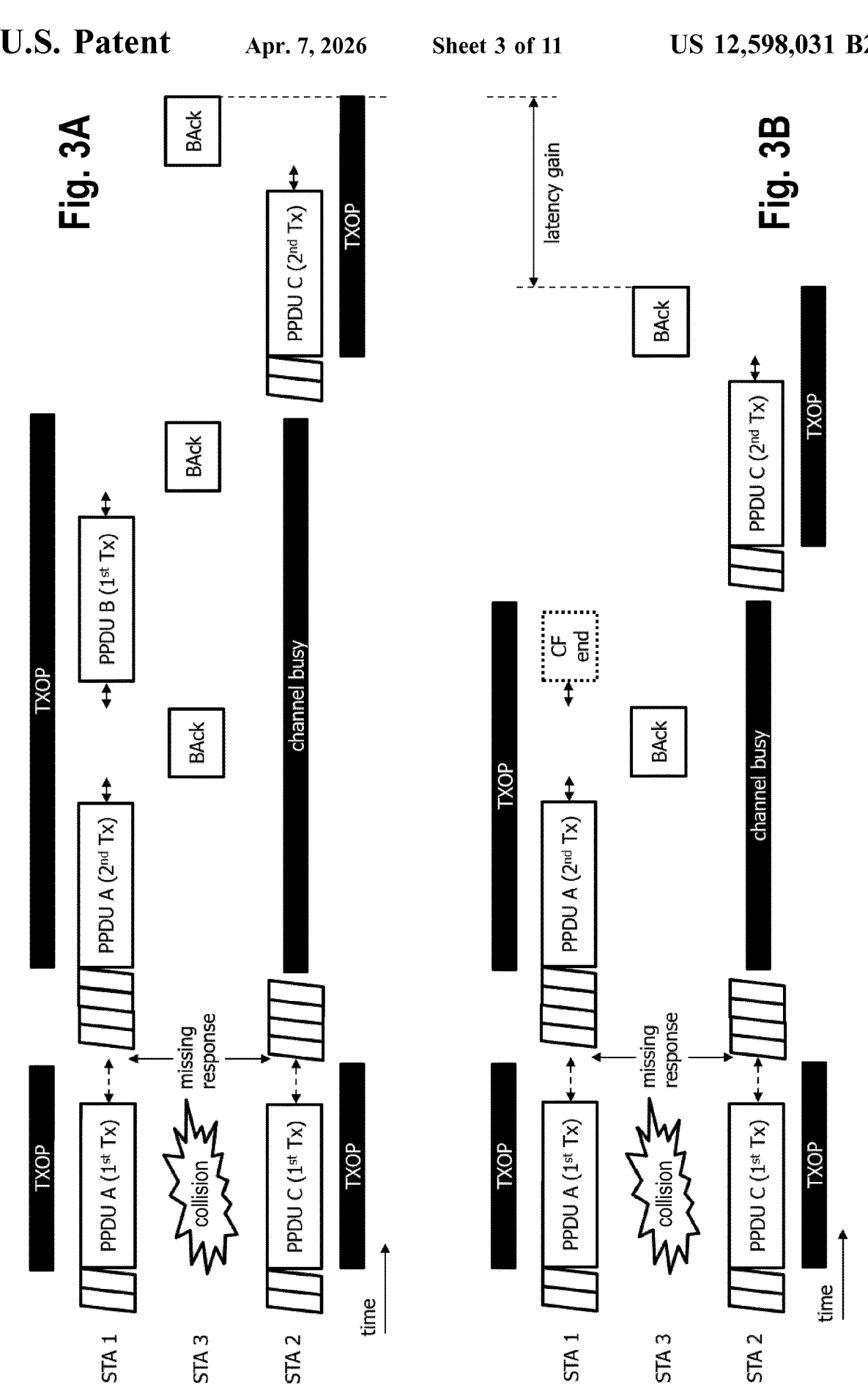
FIG. 3A shows a schematic diagram illustrating conventional retransmission operation in which new data may be sent in a transmit opportunity that holds retransmitted data.
FIG. 3B shows a schematic diagram illustrating exclusion of new data in a transmit opportunity that holds retransmitted data according to an embodiment of the present disclosure.

A second embodiment of a device and method according to the present disclosure is illustrated in FIG. 3, wherein FIG. 3A shows a schematic diagram illustrating conventional operation of a retransmission operation and FIG. 3B shows a schematic diagram illustrating exclusion of new data in a transmit opportunity that holds retransmitted data according to an embodiment of the present disclosure.

After a PPDU transmission failed, the TXOP that contains one or more PPDUs with retransmitted MPDUs shall contain no more than the MPDUs that have been transmitted in the failed PPDU. Moreover, the MPDUs are transmitted in the same order as in the failed PPDU. Several PPDUs are transmitted within the same or a new TXOP, in case the retransmitted MPDUs do not fit within one PPDU. This may happen due to temporal PPDU length constraints and/or because transmission parameters have changed. For example, in the first transmission the temporal PPDU length constraint was fully exploited. For the second transmission (the retransmission), the modulation coding scheme was set to a lower value, i.e. lower code rate and/or modulation order. Thus, the MPDUs take more time to transmit and a second PPDU is needed to convey the leftover MPDUs that did not fit in the first retransmitted PPDU.

According to this embodiment, either after each transmitted PPDU or after the latest PPDU that contains the last part of retransmitted MPDUs is transmitted, the STA solicits an Ack or BAck that indicates reception status of the retransmitted MPDUs. In case the Ack or BAck is received and all retransmitted MPDUs have been successfully received, a STA transmits a termination notification that indicates to other STAs the end of the current TXOP. The termination notification may e.g. have the form of a frame, in particular of a contention free (CF) end frame, indicating the end of a period in which STAs cannot contend.

FIG. 3 shows a scenario in which STA 1 and STA 2 want to transmit data to STA 3. Since STA 1 and STA 2 gain channel access at same time, their PPDUs collide, which is detected by STA 1 and STA 2 because of missing response of STA 3. FIG. 3A shows the regular operation in such a situation: After STA1 regained channel access, it first retransmits PPDU A followed by another PPDU B containing new data in order to exploit the TXOP duration. This causes STA 2 to deliver its PPDU C, which is to be retransmitted, significantly later. In contrast, FIG. 3B shows the operation when STA 1 terminates its TXOP after it has retransmitted PPDU A, preferably after it has received a second acknowledgement of receipt of the retransmitted data unit from STA2. Thus, STA 2 has the chance to access the channel sooner to retransmit PPDU C. Comparing FIGS. 3A and 3B clearly reveals a latency gain for the STA that retransmitted later, i.e. STA 2 in this example.

In another embodiment, after the transmission of PPDU A to STA 2 and the missing response, STA 1 may transmit, e.g. additionally or additionally to the retransmission of PPDU A, a new PPDU B that has the same and/or higher priority than the previously transmitted PPDU A. This provides the advantage that a new data frame of same or higher priority (e.g. low latency priority), that arrived while STA 1 is contending for channel access to retransmit PPDU A, can be immediately transmitted in conjunction with retransmission of PPDU A. This helps to lower the transmission latency for the new data frame as a further contention for channel access is avoided.

In regular WLAN operation, beacon frames are occasionally transmitted for advertising presence of a network. A beacon frame may cause latency if it delays a retransmission. Thus, a rule used according to various embodiment of the present disclosure that, if an AP STA sent a PPDU that failed, one of several measures may be taken, as will be illustrated with reference to FIGS. 4 and 5.

Figures 4A, 4B:
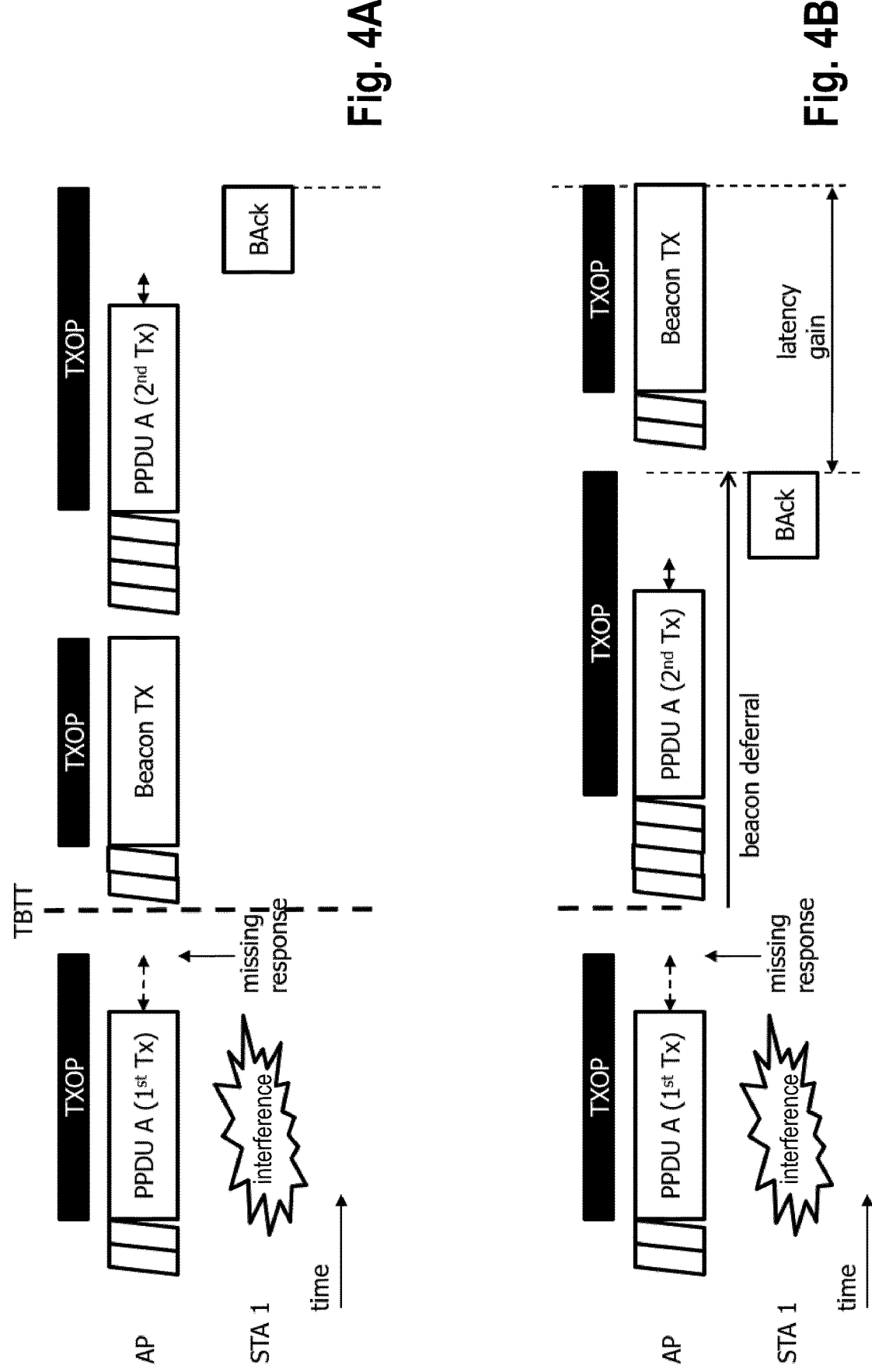
FIG. 4A shows a schematic diagram illustrating conventional collision resolution with regular beacon operation and/or length.
FIG. 4B shows a schematic diagram illustrating collision resolution with beacon deferral according to an embodiment of the present disclosure.
Figures 4C, 4D:
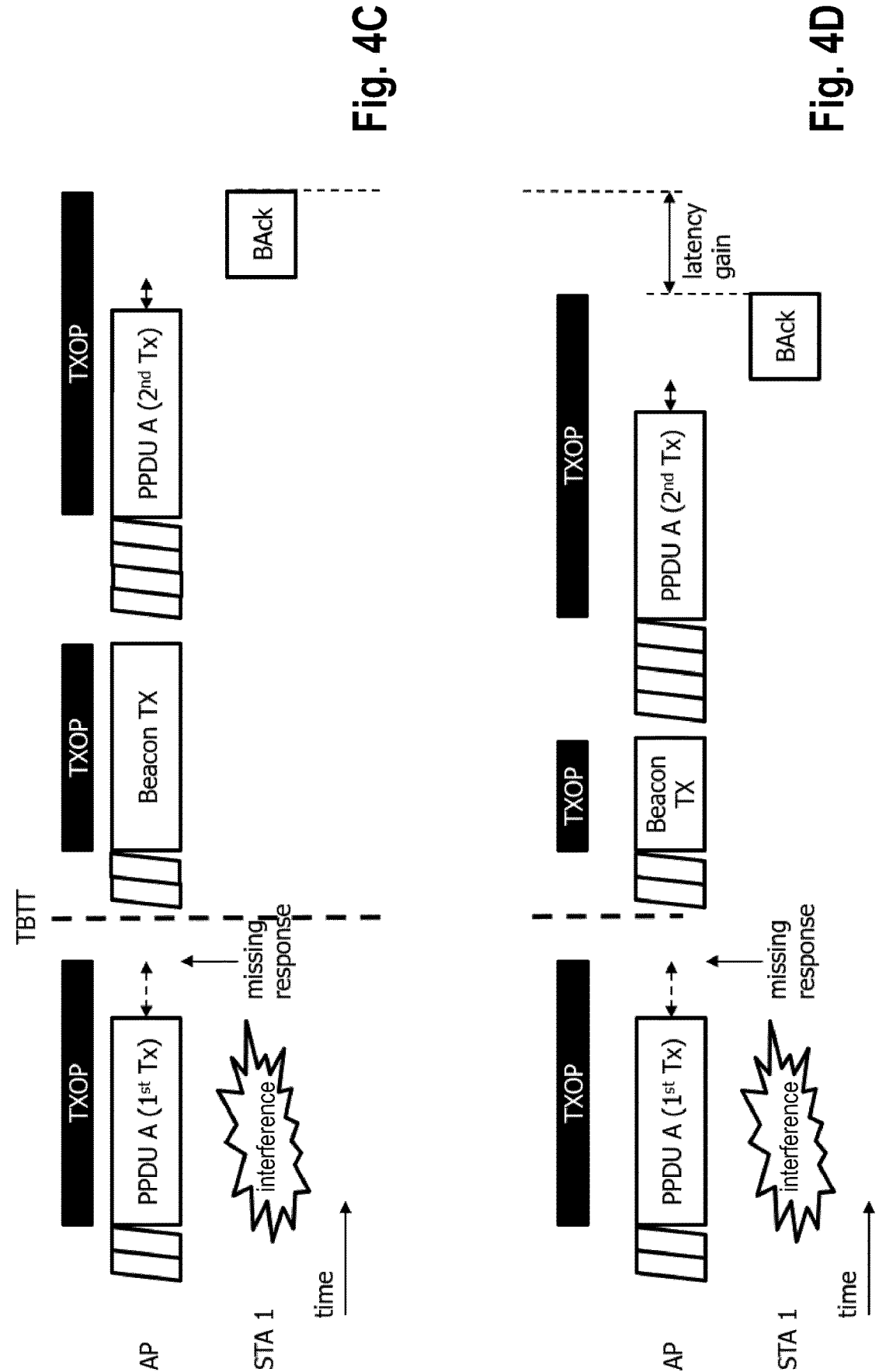
FIG. 4C is identical to FIG. 4A.
FIG. 4D shows a schematic diagram illustrating collision resolution with reduced beacon length according to an embodiment of the present disclosure.
Figures 4E, 4F:
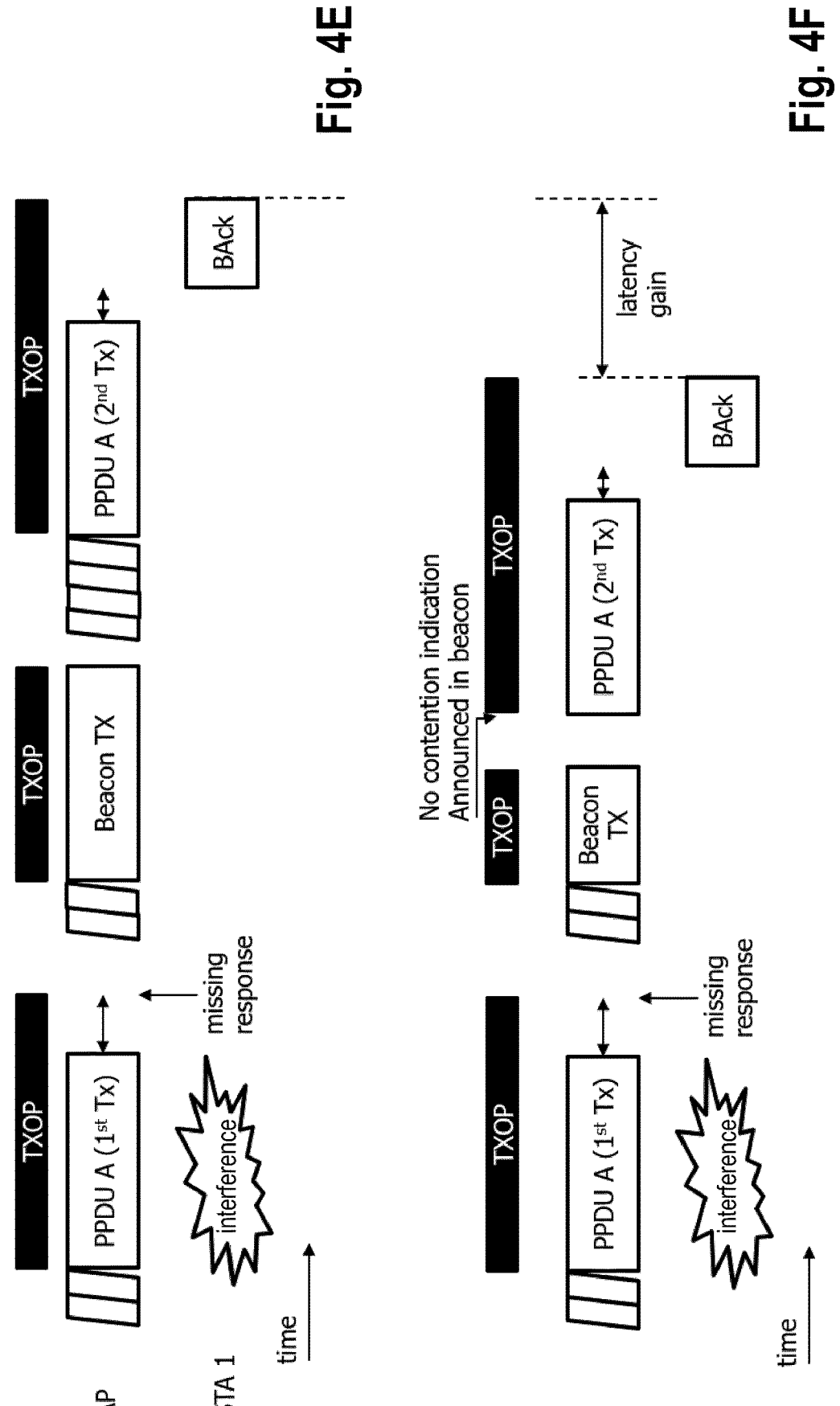
FIG. 4E is identical to FIG. 4A.
FIG. 4F shows a schematic diagram illustrating collision resolution with retransmission of data frames without contention directly after beacon transmission according to an embodiment of the present disclosure.

A third embodiment of a device and method according to the present disclosure is illustrated in FIG. 4, wherein FIGS. 4A, 4C and 4E (all being identical) show a schematic diagram illustrating conventional collision resolution with regular beacon length, FIG. 4B shows a schematic diagram illustrating collision resolution with beacon deferral according to an embodiment of the present disclosure, FIG. 4D shows a schematic diagram illustrating collision resolution with reduced beacon length according to an embodiment of the present disclosure, and FIG. 4F shows a schematic diagram illustrating collision resolution with retransmission of data frames without contention directly after beacon transmission according to an embodiment of the present disclosure.

According to this embodiment beacon frame transmission is deferred or a short beacon frame containing only the mandatory parts of the content or that is coded with high modulation and coding scheme (MCS) that is less or equal to the lowest MCS currently applied in its BSS is transmitted.

FIG. 4 shows the effect of a beacon deferral (FIG. 4B) or shorter beacon frame (FIG. 4D). A shorter beacon frame can be achieved by either less content or higher MCS. A gain in latency reveals because, the beacon is shifted in time or less time for beacon transmission is used. The deferral of beacon transmission as well as its shortening should only be done if a retransmission would coincide with a beacon transmission.

FIG. 4F shows an embodiment for contention free retransmission after a PPDU sent by an AP failed, i.e. the beacon is not deferred but time is reserved for retransmission immediately after the beacon has been transmitted. Hence, after a missed response, instead of deferring the beacon, the AP sends the retransmission directly after the beacon/short beacon frame but without contention. For this purpose, the AP reserves channel time to retransmit or allow the STA to retransmit. This is not a periodic interval but one reserved time interval occurring when no response to a retransmission was received and the following transmission from the AP is a beacon transmission. The indication of the one-time contention free interval can be indicated in the beacon or an access rule can be defined to allow a CW=0 or channel access within priority interframe spacing (PIFS) and no backoff for an AP transmitting retransmission.

In downlink the operation may be as follows: The AP includes in the beacon one indication of a contention free interval. The STA which suffered from missed packets should remain awake after the beacon transmission. The duration of this interval should cover the retransmission, the response (acknowledgement) and corresponding interframe spaces (IFSs), and it may be announced in the PPDU sent by the AP. After the announcement (e.g. after SIFS), the AP performs retransmission and awaits the response (e.g. acknowledgement). As an alternative, similar to the embodiment shown in FIG. 6B that will be explained below, if the reason for a failed response may be due to interference at the AP, the duration of this interval may be chosen to cover a response request (e.g. acknowledgement request), a response (e.g. acknowledgement), potential retransmission and a response (e.g. acknowledgement) of the retransmission. If the response to the response request indicates a non-failed PPDU, the AP may terminate the current period by transmitting a termination notification (e.g. a CF end frame) as shown in FIG. 3B.

In uplink, the operation may be as follows: If it is the AP which failed to decode the PPDU from an STA, it may send a trigger or poll at start of the contention free period directly after the beacon transmission e.g., within PIFS to request retransmission of the STA. The trigger or poll will elicit a retransmission within SIFS interval time.

Hence, according to the embodiments illustrated with reference to FIGS. 4B, 4D and 4F, if a first response is not received, channel access for non-data frames and/or data frames is changed. In particular, transmission of a beacon frame and/or the retransmission after transmission of a beacon frame is changed compared to regular transmission of the beacon frame, according to which the beacon frame has a predetermined length and is transmitted after a target beacon transmission time with a predetermined modulation and coding scheme. If a first response is not received, the one or more data frames are retransmitted to the second communication device and channel access of a beacon frame is changed compared to regular transmission of the beacon frame, according to which the beacon frame has a predetermined length and is transmitted after a target beacon transmission time with a predetermined modulation and/or coding scheme.

In an embodiment the modulation and/or coding is selected such that all STAs associated with the AP can receive and/or decode the beacon frame. Within a BSS of an AP, the links between all AP-STA pairs have different link budget due to e.g. different pathloss. The lower the link budget, the lower the modulation and/or coding scheme. If the modub-tion and/or coding is selected to the smallest modulation and/or coding scheme of all AP-STA pairs, the beacon can be received by any STA of the BSS. STAs outside the BSS may not be affected, as this behavior naturally limits the coverage area of the beacon. For this reason, this rule may only be applied for the retransmission case. In all other cases, the beacon should be transmitted with lowest MCS to keep coverage area at maximum.

Figures 5A, 5B:
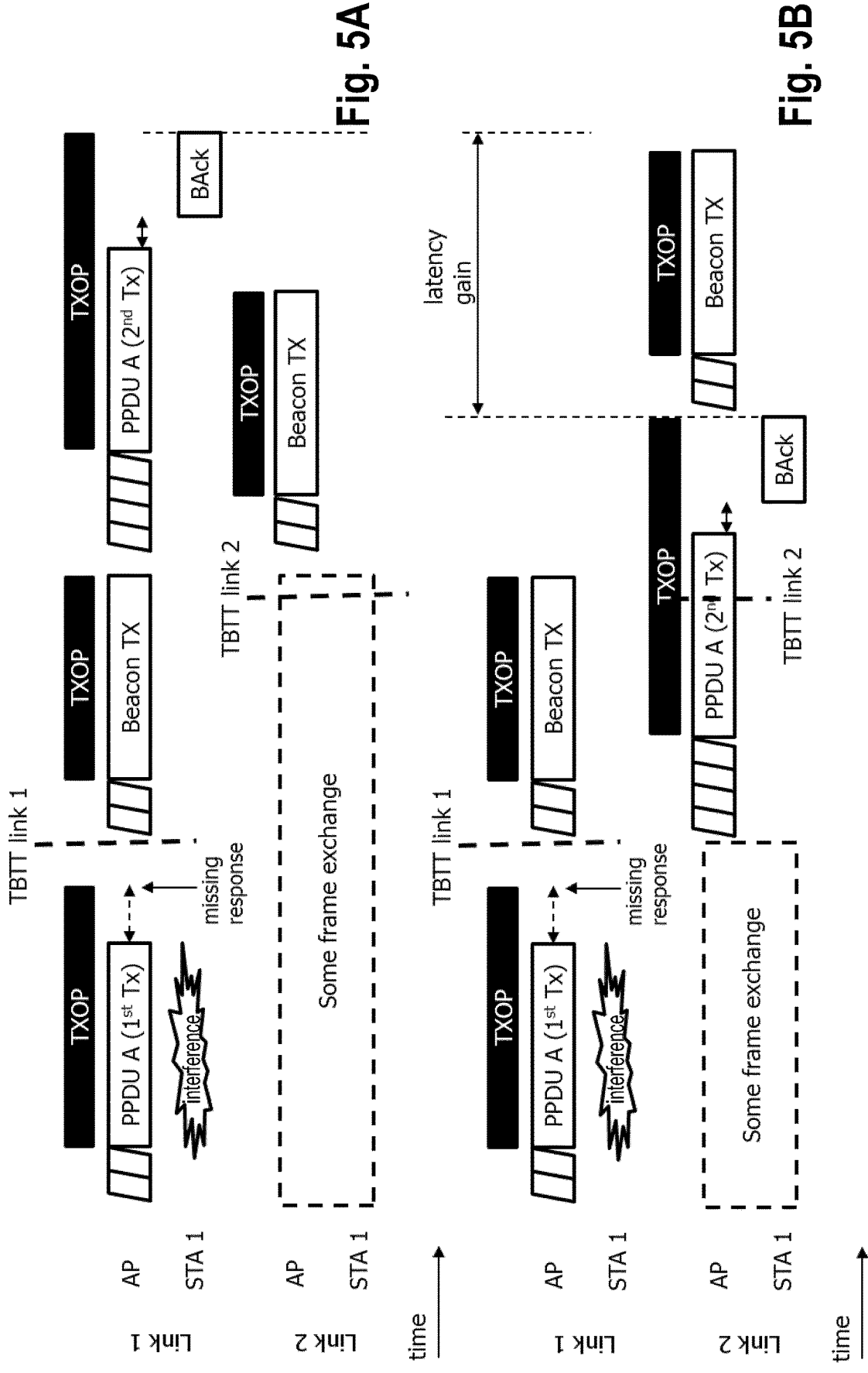
FIG. 5A shows a schematic diagram illustrating conventional operation in a multi-link setup.
FIG. 5B shows a schematic diagram illustrating collision resolution with link selection for retransmission in a multi-link setup according to an embodiment of the present disclosure.

A fourth embodiment of a device and method according to the present disclosure is illustrated in FIG. 5, wherein FIG. 5A shows a schematic diagram illustrating conventional operation in a multi-link setup and FIG. 5B shows a schematic diagram illustrating collision resolution with link selection for retransmission in a multi-link setup according to an embodiment of the present disclosure.

In case the AP STA supports multiple links, it shall use that link for retransmission in which retransmissions can be accomplished before next beacon is sent and which are enabled for the STA that needs retransmission. This operation is illustrated in FIG. 5B, which shows an example for latency reduction due to a link selection that avoids beacon transmission. It is assumed that at a point in time of retransmission, both links are enabled and that link 2 is idle.

According to the conventional operation, the beacon is transmitted as scheduled by a first target beacon transmission time (TBTT on link 1) on the first link. Afterwards, and after another contention, the data unit is retransmitted on the first link. In parallel, if scheduled by a second TBTT (on link 2), another beacon may be transmitted on the second link. According the embodiment of the present disclosure, in contrast, the data unit is retransmitted on the second link since the second TBTT (on link 2) is later than the first TBTT (on link 1). In parallel, the beacon is transmitted on the first link after the first TBTT. This provides a large latency gain compared to the conventional operation. It should be noted in this context that this embodiment also works if the STA transmitting a PPDU is a non-AP STA.

Hence, according to the embodiment illustrated with reference to FIG. 5, if a first response is not received, channel access for data frames is changed.

Figure 6A:
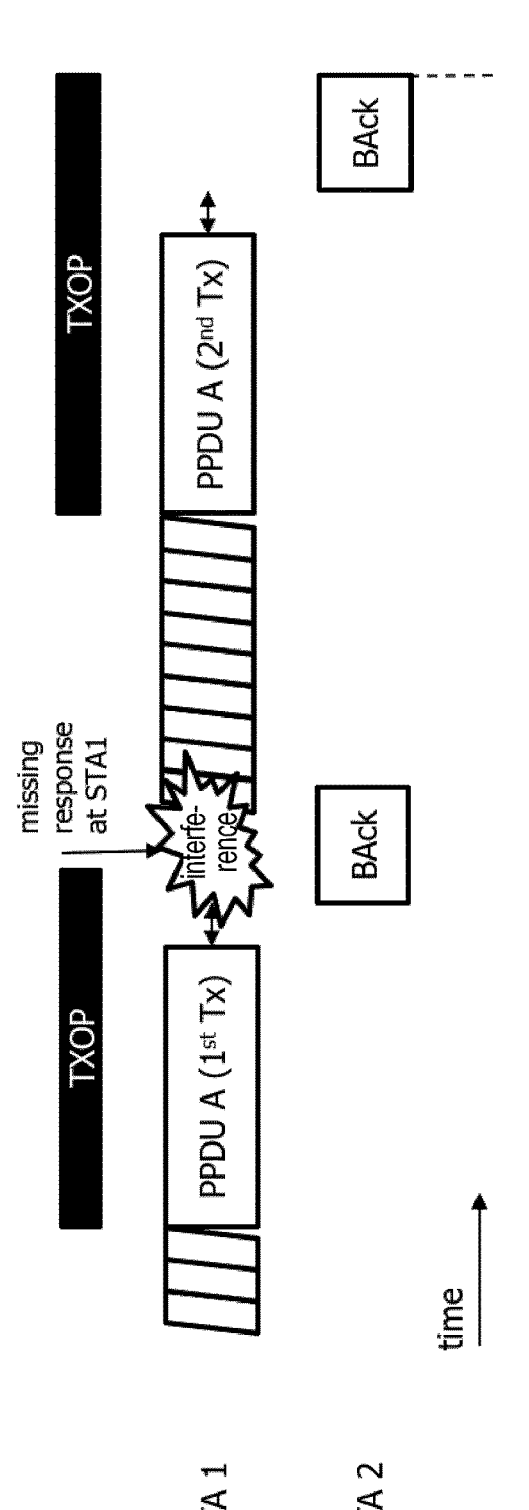
FIG. 6A shows a schematic diagram illustrating conventional operation for retransmission.
Figure 6B:
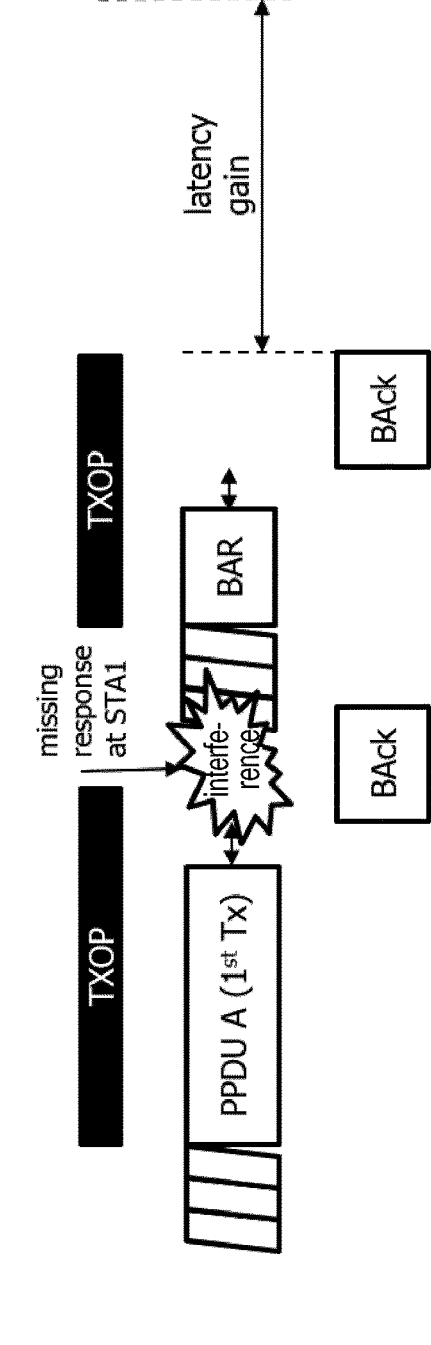
FIG. 6B shows a schematic diagram illustrating collision resolution with access prioritization of block acknowledgement request according to an embodiment of the present disclosure.

A fifth embodiment of a device and method according to the present disclosure is illustrated in FIG. 6, wherein FIG. 6A shows a schematic diagram illustrating conventional operation for retransmission and FIG. 6B shows a schematic diagram illustrating collision resolution with access prioritization of Block Acknowledgement Request (BAR) according to an embodiment of the present disclosure.

In regular WLAN, a STA may transmit a BAR in order to solicit a Block Acknowledgement holding MPDU reception status at peer STA. Before taking any actions such as retransmitting data, it may be helpful to get BAck status, because a missing BAck response may have different reasons: transmission of data PPDU failed or data PPDU is non-decodable or BAck is not received or non-decodable. In the second case (BAck is not received or non-decodable), it may happen that all data has been successfully received, but BAck was erroneous. In order to exclude unnecessary retransmissions, it is proposed in this embodiment to prioritize BAR in channel access when it is sent in a PPDU without additional MPDUs, i.e. BAR only is transmitted, and BAck response is awaited before any retransmission of a data PPDU is initiated. An implementation of such a BAR access prioritization can be as follows.

BAR can be transmitted with any access category (AC) or one AC higher than primary AC of the TXOP in which the initial transmission of the PPDU failed. For example, a data PPDU that was sent with the best effort AC can use video AC for BAR transmission. Conventionally, in WLAN any BAR uses as AC the AC of the initial transmission. It shall be noted in this context that the access category concept refers to a mechanism to prioritize various types of traffic. WLAN differentiates four different ACs: voice, video, best effort, background. All may have different channel access parameters such a CWmin and/or AIFS.

For a BAR transmission, the increase in backoff for a failed transmission is smaller as for regular data traffic. In regular WLAN, each failed PPDU transmission causes the backoff to double. This means that the range of a random CW value doubles which lowers the probability of a small backoff duration. For BAR-only transmission and a related response this behavior can be adapted to less than a doubling, e.g. 1.5-fold backoff window increase. Following a positive response with a BAck, the CW window is reset to smallest size [0 CWmin] for the next data transmission.

Further, in a variation, for the BAR transmission, a different set of EDCA parameters may be used. This means that two sets of EDCA parameters are maintained and set by the AP STA: One is for regular data transmission, whereas the other is for BAR frames and a related response only. These EDCA parameters generally contain CWmin, CWmax, AIFS, etc.

FIG. 6 shows operation with BAR access prioritization and the latency gain. Often, STA 1 does not know for which reason a BAck response is missing. Thus, in case the BAR reveals that PPDU A failed, STA 1 may be retransmit PPDU A in the same TXOP a short time (e.g. short interframe space, SIFS) after the BAck without a new contention. In this case the latency gain is smaller but should still larger than zero. This is a modification step to ensure that BAR, BAck, PPDU retransmission, and BAck achieve, on average, a smaller latency than long contention and retransmission. Thus, the following relation holds:

$$\text{contTime}\{BAR\}+\text{txTime}\{BAR\}+2\cdot\text{txTime}\{BAck\}+$$
$$\text{txTime}\{PPDU\ A(2^{nd}TX)\}\leq\text{contTime}\{PPDU$$
$$A(2^{nd}\ TX)\}+\text{txTime}\{PPDU\ A(2^{nd}\ TX)\}+$$
$$\text{txTime}\{BAck\}$$

which can be simplified to $$\text{contTime}\{BAR\}+\text{txTime}\{BAR\}+$$
$$\text{txTime}\{BAck\}<\text{contTime}\{PPDU\ A(2^{nd}\ TX)\}.$$

The acknowledgement request may thus be transmitted with a priority that is equal to or higher than the priority with which the data unit has initially been transmitted. Further, the acknowledgement request may be transmitted after a backoff that is smaller than a backoff applied for performing of a retransmission of a data unit. Still further, the acknovkA-edgement request may be transmitted with transmission parameters, of which at least one transmission parameter is different from transmission parameters used for transmitting the data unit.

Hence, according to the embodiment illustrated with reference to FIG. 6, if a first response is not received, channel access for non-data frames is changed. In particular, if a first response is not received, an acknowledgement request is transmitted to the second communication device and it is listened to a second response from the second communication device in response to the acknowledgement request. If a second response is received that indicates that none of the data frames has been received or if a second response is not received, the one or more data frames are retransmitted.

Figures 7A, 7B:
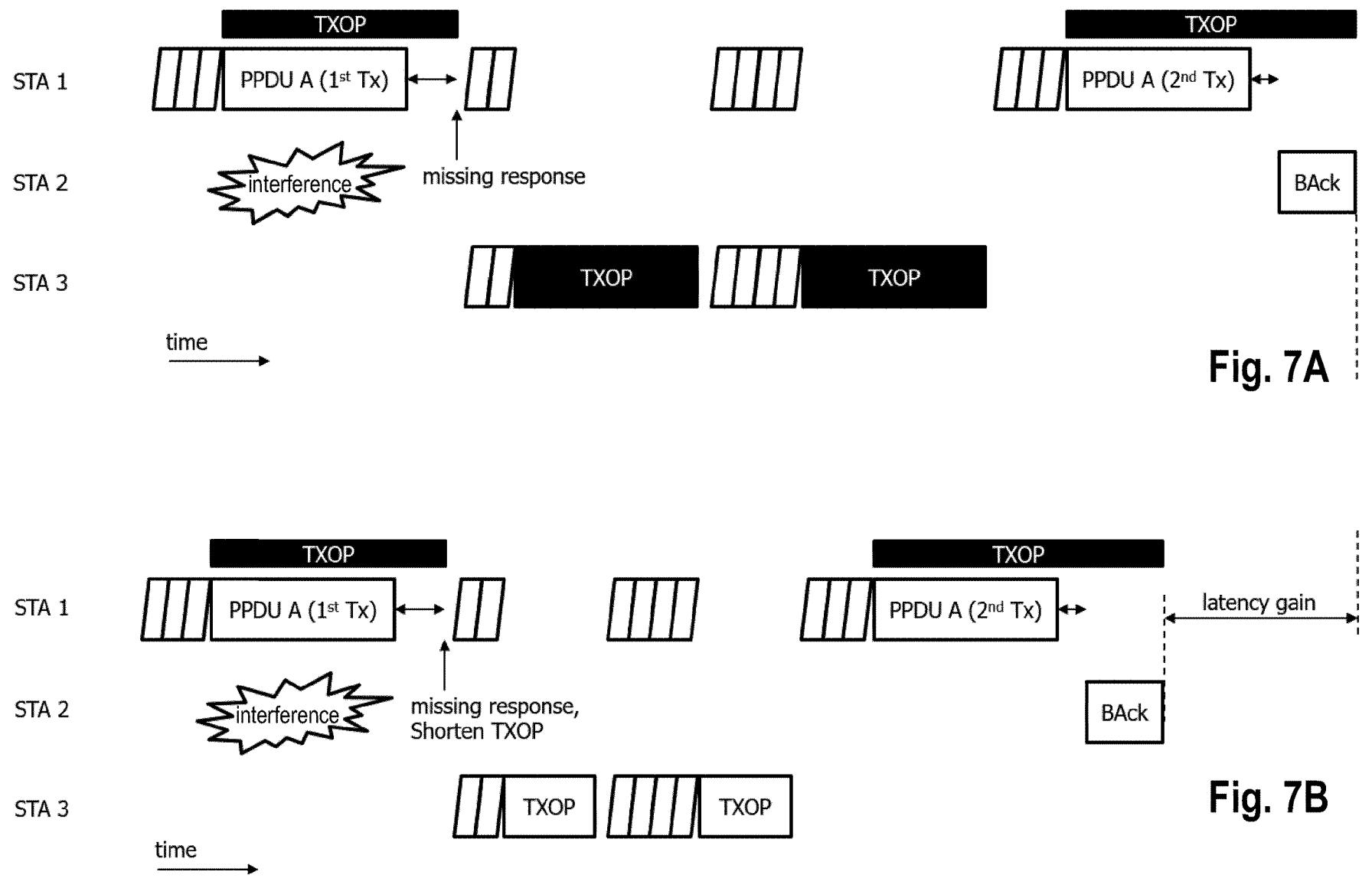

A sixth embodiment of a device and method according to the present disclosure is illustrated in FIG. 7, wherein FIG. 7A shows a schematic diagram illustrating conventional operation for retransmission with unchanged TXOP duration and FIG. 7B shows a schematic diagram illustrating TXOP duration shortening when a failed PPDU is detected according to an embodiment of the present disclosure.

According to this embodiment an AP STA or a STA that is aware of a failed PPDU shall lower the maximum duration of a TXOP. This allows a STA that transmitted a failed PPDU and has potentially a high CW value, to count down its CW value faster, because the TXOP duration of other STAs is shorter. Often the AP STA sets the TXOP duration limit and it is often aware of a collision, because an AP STA is part of any data exchange within a BSS. Thus, the AP STA may limit its TXOP duration for its communication once it detects a failed PPDU. Further, the AP STA may set TXOP duration restrictions for all STAs by an appropriate signaling within a PPDU (e.g. in a preamble) or MAC frame or MAC header (A-Control subframe).

In most cases, it may make sense to limit TXOP duration only for those STAs that do not suffer from a failed PPDU. The TXOP duration limit may be set inversely to the increase in CW. This means that the maximum TXOP duration is halved every time the CW range is doubled. Table 1 shows the envisioned operation including a saturation after the $M-1^{th}$ retransmission.

| PPDU transmission type | CW range | TXOP duration |
|---|---|---|
| $1^{st}$ Tx (initial Tx) | $0, \ldots, CWmin - 1$ | TXOP |
| $2^{nd}$ Tx ($1^{st}$ retransmission) | $0, \ldots, 2 \cdot CWmin - 1$ | TXOP/2 |
| $3^{rd}$ Tx ($2^{nd}$ retransmission) | $0, \ldots, 4 \cdot CWmin - 1$ | TXOP/4 |
| . . . | . . . | . . . |
| $M^{th}$ Tx (M − $1^{th}$ retransmission) | $0, \ldots, 2^{M-1} \cdot CWmin - 1$ | TXOP/$2^{M-1}$ |
| M + $1^{th}$ Tx ($M^{th}$ retransmission) | $0, \ldots, 2^{M-1} \cdot CWmin - 1$ | TXOP/$2^{M-1}$ |

The benefit in terms of latency is depicted in FIG. 7, which shows three STAs, wherein STA 2 may exemplarily be an AP STA. The data transfer from STA 1 to STA 2 suffers a failed PPDU, which causes STA 1 to draw a long CW. While STA 1 is counting down the CW, STA 3 is initiating two long TXOPs, e.g. a data transfer to another STA, which causes a long waiting time for STA 1 to retransmit its data.

FIG. 7A shows the conventional operation with unchanged TXOP duration, whereas FIG. 7B shows the operation with TXOP duration halved after the failed PPDU according to an embodiment of the present disclosure. It is assumed additionally in FIG. 7B that the TXOP is shortened for all STAs, except the one that suffers the failed PPDU, i.e. STA 1.

Hence, according to the embodiment illustrated with reference to FIG. 7, if a first response is not received, the transmit opportunity configuration is changed. In particular, a failed data transmission of a data frame by the communication device or the second communication device is recognized by recognizing a missing response following the transmission of the one or more data frames during a first transmit opportunity. Then, a shortened transmit opportunity is signaled to one or more third communication devices to transmit and/or receive during said shortened transmit opportunity, and/or a shortened transmit opportunity is configured to exchange data during said shortened transmit opportunity with one or more second and/or third communication devices. Afterwards, the one or more data frames are retransmitted to the second communication device or the one or more data frames retransmitted from the second communication device are received during one or more second transmit opportunities.

In another embodiment a failed data transmission of a PPDU is detected by STA 1 or STA 2 by detecting a missing response following the transmission of the one or more data frames within a PPDU during the first TXOP. A shortened TXOP is then configured to exchange data of higher and/or the same and/or lower priority during said shortened TXOP with STA 2 and/or one or more other STAs. Further, one or more data frames within a PPDUs are retransmitted to STA 2 or received when STA 2 retransmitted during one or more second TXOPs. Finally, the length (duration) of the shortened TXOP is reverted (i.e. extended again back to the original length) after the retransmission of the one or more data frames caused a second response within a second TXOP. Hereby, the shortened TXOP may be further shortened if a missing response after the retransmission of the one or more data frames to STAs is detected. Any STA has a maximum TXOP duration that it can use. This maximum TXOP duration is defined by AP and may be set for each priority differently. If a missing response occurs, this length is shortened, e.g. divided by 2. If another missing response occurs it may be further shortened, e.g. divided by 4.

This embodiment provides that a retransmission can happen earlier if a STA has mixed traffic, i.e. data frames of different priority, available. For example, STA 1 transmits low latency data frames to STA 2 with high priority, but a response by STA 2 is missing. This means that STA 1 invokes random backoff procedure for the high priority queue which may last longer than the backoff of a low priority queue. Thus, the low priority queue transmits earlier which hinders STA 1 to retransmit the high priority data frames, because the low priority data frames are transmitted before for long time. With the proposed TXOP shortening, if the TXOP for the low priority queue is lowered when a missing response occurred for the high priority queue, the high priority queue may transmit earlier as the maximum time of the low priority data frames on the wireless medium is shortened. The TXOP of the low priority queue still hinders immediate retransmission of the high priority data frames but for shorter time.

In an embodiment using MU PPDU transmission, the operation may be as follows: Initially, there is a first set of two or more STAs that are addressed, each with one or more data frames. A subset (i.e., at least one) of the one or more data frames may require a response. A further subset (i.e., at least one) of the one or more data frames is acknowledged. If the last subset is empty, the steps disclosed herein are carried out, i.e. the transmit opportunity configuration and/or the channel access for non-data frames and/or data frames is changed. If the last subset is non-empty, these steps are not carried out.

Figure 8:
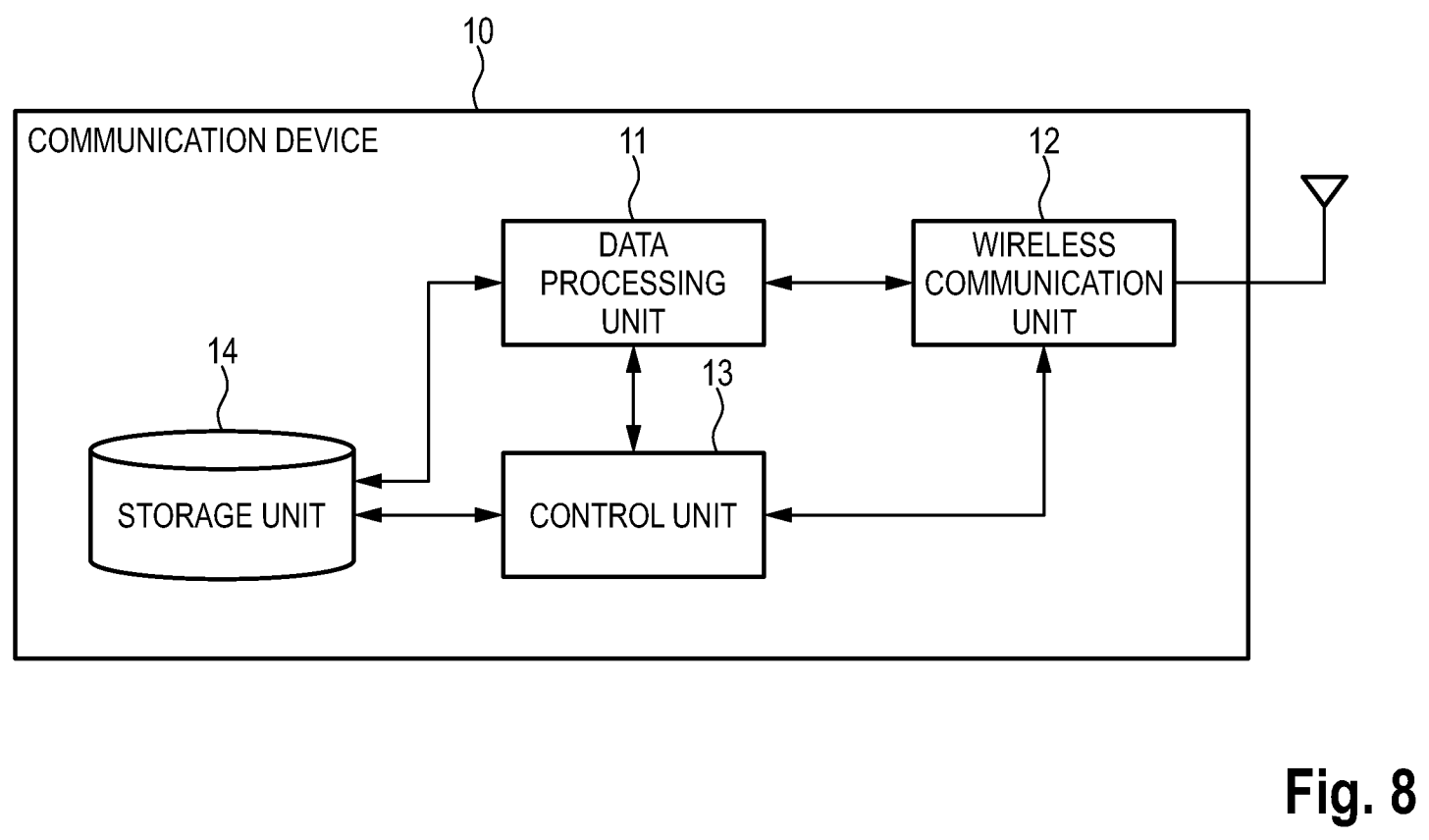

FIG. 8 shows a schematic diagram of the configuration of a communication device 10 according to an embodiment of the present disclosure. Generally, each of the APs and the STAs may be configured as shown in FIG. 8 and may include a data processing unit 11, a wireless communication unit 12, a control unit 13, and a storage unit 14.

As a part of a communication device 10, the data processing unit 11 performs a process on data for transmission and reception. Specifically, the data processing unit 11 generates a frame on the basis of data from a higher layer of the communication device 10, and provides the generated frame to the wireless communication unit 12. For example, the data processing unit 11 generates a frame (or a packet, in particular a MAC packet) from the data, and performs a process on the generated frame such as addition of a MAC header for media access control (MAC), addition of an error detection code, or the like. In addition, the data processing unit 11 extracts data from the received frame, and provides the extracted data to the higher layer of the communication device 10. For example, the data processing unit 11 acquires data by analyzing a MAC header, detecting and correcting a code error, and performing a reorder process, or the like regarding the received frame.

In this context, in WLAN terminology a frame is referred to as Service Data Units from higher layer data, to which further processing such as fragmentation, aggregation, header addition, etc. is applied in order to create MAC layer frames. Further, in WLAN terminology a packet is referred to as PHY protocol data unit (PPDU). Packets may further be understood as Physical Layer packets.

The wireless communication unit 12 has a signal processing function, a wireless interface function, and the like as part of a communication unit.

The signal processing function is a function of performing signal processing such as modulation on frames. Specifically, the wireless communication unit 12 performs encoding, interleaving, and modulation on the frame provided from the data processing unit 11 in accordance with a coding and modulation scheme set by the control unit 13, adds a preamble and a PHY header, and generates a symbol stream. Further, the wireless communication unit 12 acquires a frame by performing demodulation, decoding, and the like on the symbol stream obtained by a process of the wireless interface function, and provides the obtained frame to the data processing unit 11 or the control unit 13.

The wireless interface function is a function to transmit/receive a signal via one or more antennas. Specifically, the wireless communication unit 12 converts a signal related to the symbol stream obtained through the process performed by the signal processing function into an analog signal, amplifies the signal, filters the signal, and up-converts the frequency. Next, the wireless communication unit 12 transmits the processed signal via the antenna. In addition, on the signal obtained via the antenna, the wireless communication unit 12 performs a process that is opposite to the process at the time of signal transmission such as down-conversion in frequency or digital signal conversion.

As a part of the communication unit, the control unit 13 (often referred to as station management entity (SME)) controls entire operation of the communication device 10.

Specifically, the control unit 13 performs a process such as exchange of information between functions, setting of communication parameters, or scheduling of frames (or packets) in the data processing unit 11.

The storage unit 14 stores information to be used for processing to be performed by the data processing unit 11 or the control unit 13. Specifically, the storage unit 14 stores information stored in a transmission frame, information acquired from a receiving frame, information on a communication parameter, or the like.

In an alternative embodiment, each of the APs and the STAs may be configured by use of circuitry that implements the units shown in FIG. 8 and the functions to be carried out. The circuitry may e.g. be realized by a programmed processor. Generally, the functionalities of APs and STAs and the units of the communication device 10 shown in FIG. 8 may be implemented in software, hardware or a mix of software and hardware.

Figure 9:
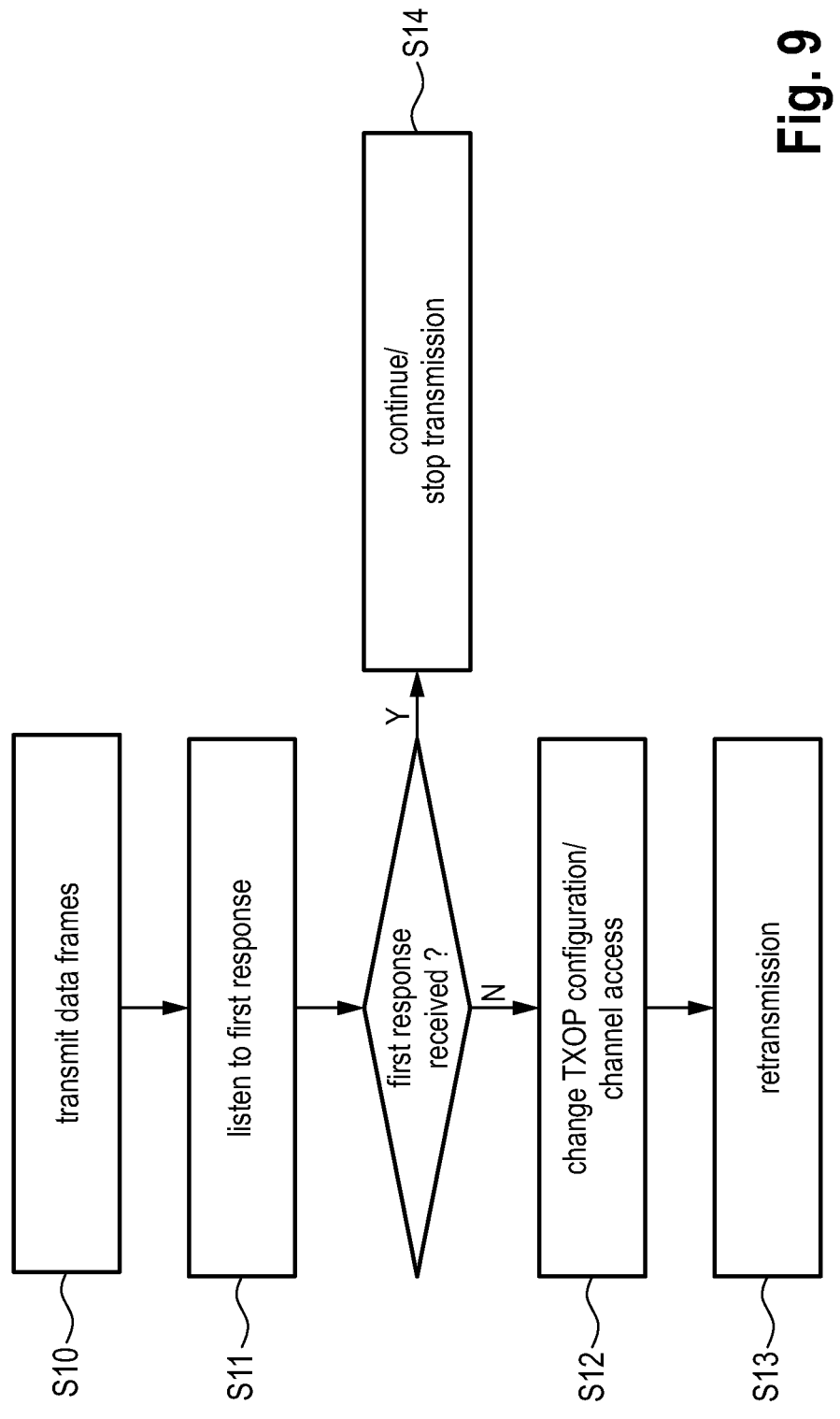
FIG. 9 shows a flow chart of an embodiment of a communication method according to the present disclosure

FIG. 9 shows a flow chart of an embodiment of a communication method of a first communication device for communicating with a second communication device according to the present disclosure. In a first step (S10) one or more data frames are transmitted from the first communication device to the second communication device that require a response by the second communication device. In a second step S11 the first communication device listens to a first response (e.g. an Ack or BAck) acknowledging receipt of at least one of the one or more data frames from the second communication device. In a third step S12, if a first response is not received, the first communication device changes transmit opportunity configuration and/or channel access for non-data frames and/or data frames, in particular according to one or more of the embodiments disclosed herein, before the one or more data frames are retransmitted (step S13). Otherwise (step S14), the (normal) transmission of data frames continues or, if there are no further data frames, the transmission is stopped.

The presented embodiments of the present disclosure provide rules for channel access in unlicensed bands to reduce latency in case a data carrying PPDU failed. The rules sacrifice throughput in favor of reduced latency. An AP STA may enable these rules to achieve low latency data transfer within its basic service set (BSS) or cell.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Communication device configured to communicate with a second communication device, the communication device comprising circuitry configured to transmit one or more data frames to the second communication device that require a response by the second communication device, listen to a first response acknowledging receipt of at least one of the one or more data frames from the second communication device, and, if a first response is not received, change transmit opportunity configuration and/or channel access for non-data frames and/or data frames.

2. Communication device as defined in embodiment 1, wherein the circuitry is configured to transmit, if a first response is not received, an acknowledgement request to the second communication device, listen to a second response from the second communication device in response to the acknowledgement request, and retransmit, if a second response is received that indicates that none of the data frames has been received or if a second response is not received, the one or more data frames.

3. Communication device as defined in embodiment 2, wherein the circuitry is configured to transmit the acknowledgement request with a channel access priority higher than the channel access priority with which the first of the one or more data frames has initially been transmitted.

4. Communication device as defined in embodiment 2 or 3, wherein the circuitry is configured to transmit the acknowledgement request after a channel access backoff that is smaller than a channel access backoff applied for performing a retransmission of one or more data frames.

5. Communication device as defined in any one of embodiments 2 to 4, wherein the circuitry is configured to retransmit the one or more data frames in the same transmit opportunity in which the acknowledgment request is transmitted.

6. Communication device as defined in any one of embodiments 2 to 5, wherein the circuitry is configured to transmit the acknowledgement request with channel access parameters, of which at least one channel access parameter is different from channel access parameters used for transmitting and/or retransmitting the one or more data frames.

7. Communication device as defined in any one of the preceding embodiments, wherein the circuitry is configured to configure, if a first response is not received, the next transmit opportunity obtained by the communication device to include only i) the retransmission of the one or more data frames to the second communication device, and the reception of a second response acknowledging receipt of the retransmitted one or more data frames from the second communication device, and/or, ii) the transmission of one or more data frames to the second communication device that have the same and/or higher priority than the previously transmitted one or more data frames or than one or more data frames to be retransmitted, and/or, iii) if a second response is received, a notification indicating that no further data frames are transmitted in the same transmit opportunity by the communication device.

8. Communication device as defined in embodiment 7, wherein notification further indicates that the second communication device may use the current transmit opportunity for data transmission.

9. Communication device as defined in embodiment 7 or 8, wherein the circuitry is configured to transmit a contention free end frame as notification.

10. Communication device as defined in any one of the preceding embodiments, wherein the circuitry is configured to transmit the one or more data frames to the second communication device on a first link, listen to a first response acknowledging receipt of the one or more data frames from the second communication device on the first link, if a first response is not received, switch channel access to a second link to retransmit the one or more data frames to the second communication device on a second link having a second target beacon transmission time that is later than a first target beacon transmission time of the first link or having no beacon transmission, and transmit a beacon frame on the first link after the first target beacon transmission time has passed.

11. Communication device as defined in any one of the preceding embodiments, wherein the circuitry is configured to, if a first response is not received, retransmit the one or more data frames to the second communication device and change channel access of a beacon frame compared to regular transmission of the beacon frame, according to which the beacon frame has a predetermined length and is transmitted after a target beacon transmission time with a predetermined modulation and/or coding scheme.

12. Communication device as defined in embodiment 11, wherein the circuitry is configured to change channel access to defer the transmission of the beacon frame and retransmit the one or more data frames before the beacon frame is transmitted.

13. Communication device as defined in embodiment 11 or 12, wherein the circuitry is configured to transmit a shortened beacon frame having a length shorter than the predetermined length and retransmit the data unit after the shortened beacon frame is transmitted.

14. Communication device as defined in any one of embodiments 11 to 13, wherein the circuitry is configured to transmit the beacon frame with a modulation and/or coding scheme that is different from the predetermined modulation and coding scheme and retransmit the one or more data frames after the beacon frame is transmitted.

15. Communication device as defined in embodiment 14, wherein the circuitry is configured to select the modulation and/or coding such that all second communication devices associated with the communication device can receive and/or decode the beacon frame.

16. Communication device as defined any one of the preceding embodiments, wherein the circuitry is configured to retransmit the one or more data frames to the second communication device without contention after a beacon frame has been transmitted.

17. Communication device as defined in embodiment 16, wherein a contention free interval between the transmission of the beacon frame and the retransmission of the one or more data frames is announced in a beacon.

18. Communication device as defined in any one of the preceding embodiments, wherein the circuitry is configured to retransmit the one or more data frames in parts and to use one or more transmission parameters for retransmitting the one or more data frames that are different from the transmission parameters used for initially transmitting the one or more data frames, wherein the transmission parameters for retransmitting the parts of the one or more data frames are identical.

19. Communication device as defined in any one of the preceding embodiments, wherein the circuitry is configured to
retransmit a first part of the one or more data frames,
listen to a second response acknowledging receipt of the transmitted first part of the one or more data frames from the second communication device,
retransmit, if a second response is received, one or more further parts of the one or more data frames using one or more transmission parameters that are different from the transmission parameters used for initially transmitting the one or more data frames.

20. Communication device as defined in embodiment 18 or 19,
wherein one or more transmission parameters used for retransmitting the one or more data frames are different from the transmission parameters used for initially transmitting the one or more data frames, wherein the transmission parameters for retransmitting the parts of the one or more data frames are identical.

21. Communication device as defined in any one of embodiments 18 to 20,
wherein the one or more different transmission parameters include one or more transmission parameters of the group of transmission parameters including modulation and/or coding scheme, transmission bandwidth, number of spatial streams, transmit method and type of a data frame.

22. Communication device as defined in any one of the preceding embodiments, wherein the circuitry is configured to
recognize a failed data transmission of a data frame by the communication device or the second communication device by recognizing a missing response following the transmission of the one or more data frames during a first transmit opportunity,
signal a shortened transmit opportunity to one or more third communication devices to transmit and/or receive during said shortened transmit opportunity, and/or configure a shortened transmit opportunity to exchange data during said shortened transmit opportunity with one or more second and/or third communication devices, and retransmit the one or more data frames to the second communication device or receive the one or more data frames retransmitted from the second communication device during one or more second transmit opportunities.

23. Communication device as defined in any one of the preceding embodiments, wherein the circuitry is configured to receive an instruction from the second communication device or a third communication device indicating if and/or how transmit opportunity configuration and/or channel access are to be changed if a first response is not received.

24. Communication device as defined in any one of the preceding embodiments, wherein the circuitry is configured to
transmit the one or more data frames to two or more second communication devices, wherein at least one of said one or more data frames requires a response,
listen to a first response acknowledging receipt of at least one of the one or more data frames from the two or more second communication devices, and,
if no first response is received from the two or more second communication devices, change the transmit opportunity configuration and/or the channel access for non-data frames and/or data frames.

25. Communication device as defined in any one of the preceding embodiments, wherein the circuitry is configured to
listen for a predetermined backoff time to a channel, if the channel is detected idle at the end of the predetermined backoff time, and,
if the channel is detected non-idle, subtract a time span until the channel has been detected non-idle from the predetermined backoff time and wait until it is detected idle again.

26. Communication device as defined in any one of the preceding embodiments, wherein the circuitry is configured to change, if a first response is not received, transmit opportunity configuration and/or channel access for non-data frames and/or data frames until at least one of the one or more data frames has been successfully retransmitted or a timeout has been reached.

27. Communication method of a communication device for communicating with a second communication device, the communication method comprising
transmitting one or more data frames to the second communication device that require a response by the second communication device,
listening to a first response acknowledging receipt of at least one of the one or more data frames from the second communication device, and,
if a first response is not received, changing transmit opportunity configuration and/or channel access for non-data frames and/or data frames.

28. A non-transitory computer-readable recording medium that stores therein a computer program product, which, when executed by a processor, causes the method according to embodiment 27 to be performed.

29. A computer program comprising program code means for causing a computer to perform the steps of said method according to embodiment 27 when said computer program is carried out on a computer.

30. Communication device configured to communicate with a second communication device, the communication device comprising circuitry configured to transmit one or more data frames to the second communication device that require a response by the second communication device, listen to a first response acknowledging receipt of at least one of the one or more data frames from the second communication device, transmit, if a first response is not received, an acknowledgement request to the second communication device, listen to a second response from the second communication device in response to the acknowledgement request, and retransmit, if a second response is received that indicates that none of the data frames has been received or if a second response is not received, the one or more data frames.

31. Communication device configured to communicate with a second communication device, the communication device comprising circuitry configured to transmit one or more data frames to the second communication device that require a response by the second communication device, listen to a first response acknowledging receipt of at least one of the one or more data frames from the second communication device, configure, if a first response is not received, the next transmit opportunity obtained by the communication device to include only i) the retransmission of the one or more data frames to the second communication device, and the reception of a second response acknowledging receipt of the retransmitted one or more data frames from the second communication device, and/or, ii) if a second response is received, a notification indicating that no further data frames are transmitted in the same transmit opportunity by the communication device.

32. Communication device configured to communicate with a second communication device, the communication device comprising circuitry configured to transmit the one or more data frames to the second communication device on a first link, listen to a first response acknowledging receipt of the one or more data frames from the second communication device on the first link, if a first response is not received, switch channel access to a second link to retransmit the one or more data frames to the second communication device on a second link having a second target beacon transmission time that is later than a first target beacon transmission time of the first link or having no beacon transmission, and transmit a beacon frame on the first link after the first target beacon transmission time has passed.

33. Communication device configured to communicate with a second communication device, the communication device comprising circuitry configured to transmit one or more data frames to the second communication device that require a response by the second communication device, listen to a first response acknowledging receipt of at least one of the one or more data frames from the second communication device, and, if a first response is not received, retransmit the one or more data frames to the second communication device and change channel access of a beacon frame compared to regular transmission of the beacon frame, according to which the beacon frame has a predetermined length and is transmitted after a target beacon transmission time with a predetermined modulation and/or coding scheme.

34. Communication device configured to communicate with a second communication device, the communication device comprising circuitry configured to transmit one or more data frames to the second communication device that require a response by the second communication device, listen to a first response acknowledging receipt of at least one of the one or more data frames from the second communication device, and, if a first response is not received, retransmit the one or more data frames in parts and to use one or more transmission parameters for retransmitting the one or more data frames that are different from the transmission parameters used for initially transmitting the one or more data frames, wherein the transmission parameters for retransmitting the parts of the one or more data frames are identical.

35. Communication device configured to communicate with a second communication device, the communication device comprising circuitry configured to transmit one or more data frames to the second communication device that require a response by the second communication device, listen to a first response acknowledging receipt of at least one of the one or more data frames from the second communication device, and, if a first response is not received, retransmit a first part of the one or more data frames, listen to a second response acknowledging receipt of the transmitted first part of the one or more data frames from the second communication device, retransmit, if a second response is received, one or more further parts of the one or more data frames using one or more transmission parameters that are different from the transmission parameters used for initially transmitting the one or more data frames.

36. Communication device configured to communicate with a second communication device, the communication device comprising circuitry configured to recognize a failed data transmission of a data frame by the communication device or the second communication device by recognizing a missing response following the transmission of the one or more data frames during a first transmit opportunity, signal a shortened transmit opportunity to one or more third communication devices to transmit and/or receive during said shortened transmit opportunity, and/or configure a shortened transmit opportunity to exchange data during said shortened transmit opportunity with one or more second and/or third communication devices, and retransmit the one or more data frames to the second communication device or receive the one or more data frames retransmitted from the second communication device during one or more second transmit opportunities.

37. Communication device as defined in any one of embodiments 1 to 26, wherein the circuitry is configured to detect a failed data transmission of a data frame by the communication device or the second communication device by detecting a missing response following the transmission of the one or more data frames during a first transmit opportunity, configure a shortened transmit opportunity, preferably for lower priority data transmission, to exchange data of higher and/or the same and/or lower priority during said shortened transmit opportunity with one or more second and/or third communication devices, retransmit the one or more data frames to the second communication device or receive the one or more data frames retransmitted from the second communication device during one or more second transmit opportunities, and revert the transmit opportunity length after the retransmission of the one or more data frames to cause a second response within a second transmit opportunity and/or to shorten the shortened transmit opportunity further if a missing response after the retransmission of the one or more data frames to the second communication device is detected.

The invention claimed is:

1. A communication device configured to communicate with a second communication device, the communication device comprising circuitry configured to:

transmit one or more data frames to the second communication device that require a response by the second communication device, listen to a first response acknowledging receipt of at least one of the one or more data frames from the second communication device, and, if the first response is not received, change transmit opportunity configuration and/or channel access for non-data frames and/or data frames by:

retransmitting the one or more data frames to the second communication device and changing channel access of a beacon frame compared to regular transmission of the beacon frame, according to which the beacon frame has a predetermined length and is transmitted after a target beacon transmission time with a predetermined modulation and/or coding scheme.

2. The communication device as claimed in claim 1, wherein the circuitry is configured to change the channel access to defer the transmission of the beacon frame and retransmit the one or more data frames before the beacon frame is transmitted and/or transmit a shortened beacon frame having a length shorter than the predetermined length and retransmit the one or more data frames after the shortened beacon frame is transmitted.

3. The communication device as claimed in claim 1, wherein the circuitry is configured to transmit the beacon frame with a modulation and/or coding scheme that is different from the predetermined modulation and coding scheme and retransmit the one or more data frames after the beacon frame is transmitted, wherein the circuitry is preferably configured to select the modulation and/or coding scheme such that all second communication devices associated with the communication device can receive and/or decode the beacon frame.

4. A communication device configured to communicate with a second communication device, the communication device comprising circuitry configured to:

transmit one or more data frames to the second communication device that require a response by the second communication device, listen to a first response acknowledging receipt of at least one of the one or more data frames from the second communication device, and if the first response is not received, change transmit opportunity configuration and/or channel access for non-data frames and/or data frames, wherein the circuitry is configured to retransmit a first part of the one or more data frames, listen to a second response acknowledging receipt of the transmitted first part of the one or more data frames from the second communication device, retransmit, if the second response is received, one or more further parts of the one or more data frames using one or more transmission parameters that are different from the transmission parameters used for initially transmitting the one or more data frames.

5. A communication method of a communication device for communicating with a second communication device, the communication method comprising:

transmitting one or more data frames to the second communication device that require a response by the second communication device, listening to a first response acknowledging receipt of at least one of the one or more data frames from the second communication device, and, if the first response is not received, changing transmit opportunity configuration and/or channel access for non-data frames and/or data frames, the communication method comprising:

recognizing a failed data transmission of a data frame by the communication device or the second communication device by recognizing a missing response following the transmission of the one or more data frames during a first transmit opportunity, signaling a shortened transmit opportunity to one or more third communication devices to transmit and/or receive during the shortened transmit opportunity, and/or configuring a shortened transmit opportunity to exchange data during the shortened transmit opportunity with one or more second and/or third communication devices, and retransmitting the one or more data frames to the second communication device or receiving the one or more data frames retransmitted from the second communication device during one or more second transmit opportunities.

6. A non-transitory computer-readable recording medium that stores therein a computer program product, which, when executed by a processor, causes the method according to claim 5 to be performed.

* * * * *